Figure 1:
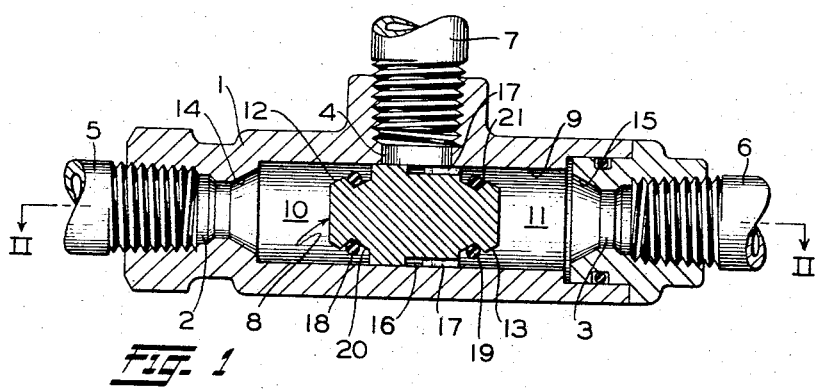

Aug. 29, 1967   J. F. FERGUSON   3,338,257
DOUBLE CHECK VALVE
Filed May 22, 1964

INVENTOR.
James F. Ferguson
BY
Attorney

United States Patent Office 3,338,257
Patented Aug. 29, 1967

3,338,257
DOUBLE CHECK VALVE
James F. Ferguson, Irwin, Pa., assignor to Westinghouse Air Brake Company, Wilmerding, Pa., a corporation of Pennsylvania
Filed May 22, 1964, Ser. No. 369,536
2 Claims. (Cl. 137—112)

This invention relates to double check valve devices of the type having two oppositely arranged fluid pressure inlet ports and a fluid pressure outlet port alternatively connectible to one or the other of the inlet ports depending upon the position of a pressure actuated shuttle valve member, and, more particularly, to such double check valve devices having means for assuring communication between one or the other of said inlet ports and the outlet under all conditions.

A double check valve device of the above-mentioned type is presently used, for example, in railway locomotive brake equipment of the combined electro-pneumatic and pneumatic type wherein one inlet of the double check valve device is connected to the electro-pneumatic portion and the other inlet is connected to the pneumatic portion. Initiation of a brake application by the operator effects concurrent energization of the electro-pneumatic portion and a reduction of pressure in the brake pipe of the pneumatic portion for causing actuation of both portions of the brake equipment and, thereby, concurrent supply of pressurized control fluid to both inlets of the double check valve device. Depending upon which side of the shuttle valve is subject to the higher pressure, the shuttle valve is operative responsively thereto to connect the higher pressure inlet to the outlet to thus effect delivery of control pressure to a relay valve device which is thereby operated to effect supply of fluid pressure to the brake cylinders accordingly. With both the electro-pneumatic and the pneumatic portions of the brake system operating to supply control pressure to both inlets of the double check valve device concurrently, a brake application, when initiated, is thus insured should one portion or the other of the brake system fail. In some instances, however, when the fluid pressures supplied to the opposite inlets of the check valve device may be coincidentally equal, the shuttle valve "hangs-up" in a position midway between the two inlets to block off the outlet and thus prevent supply of control fluid pressure to the relay valve for effecting a brake application, such failure of brakes to apply having obviously serious consequences.

Accordingly, it is an object of the invention to insure against failure of the brakes to apply by reason of the shuttle valve of the double check valve "hanging-up" between the inlet ports in a manner to block flow of fluid under pressure through the double check valve device.

According to the invention, there is provided a double check valve device having a shuttle valve member characterized by passage means therein to provide for flow of fluid under pressure from one inlet of the double check valve device to the outlet notwithstanding the shuttle valve member being "hung-up" between the inlet ports, such passage means being such as to not interfere with normal shuttle valve operation.

Figure 2:
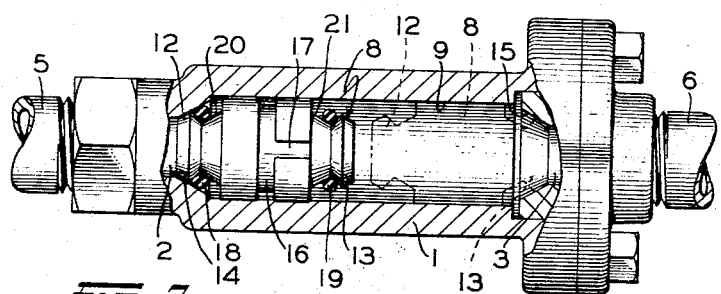
Figure 3:
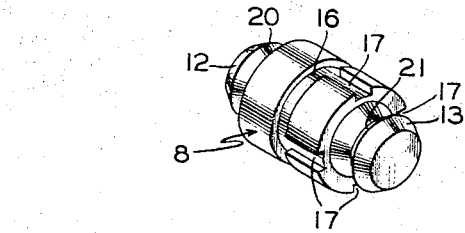

In the drawing, FIG. 1 is a sectional view of a double check valve device embodying the invention; FIG. 2 is a cutaway view, partly in section, of the valve device shown in FIG. 1, taken along line II—II and viewed in the direction indicated by the arrows; and FIG. 3 is a perspective view of a valve member from the check valve device shown in FIG. 1.

*Description and operation*

As shown in FIG. 1, a double check valve device embodying the invention may comprise a generally cylindrical casing 1 having fluid pressure inlet ports 2 and 3 at opposite ends thereof and an outlet or delivery port 4 opening from the side of said casing midway between said inlet ports. The inlet ports 2 and 3 are adapted to be connected by respective conduits 5 and 6 to two different fluid pressure supply lines (not shown), the fluid pressure in each being independently controlled and variable within respective prescribed ranges. The delivery port 4 is adapted to be connected by a conduit 7 to a fluid pressure receiving device (not shown).

A cylindrical or shuttle valve member 8 is axially slidable with a substantially close-fitting relationship in a coaxially disposed bore 9 in the casing 1, said shuttle valve member being subjected on oppositely arranged pressure faces at opposite ends thereof to respective fluid pressures prevailing in adjacent pressure chambers 10 and 11 formed cooperatively by said valve member and said casing and opening to inlet ports 2 and 3, respectively. The valve member 8 is provided, at opposite ends thereof adjacent chambers 10 and 11, with annular valve portions 12 and 13 adapted for selective seating on annular valve seats 14 and 15 formed in the casing 1 in surrounding relation to the inlet ports 2 and 3 adjacent said pressure chambers, respectively. The valve member 8 is of such axial length relative to its over-all travel distance in bore 9 that in a first position, that is, with valve 12 seated on valve seat 14, as shown on the left-hand side in FIG. 2, communication between inlet port 2 and delivery port 4 is cut off while inlet port 3 is in communication with said delivery port, and when said valve member is in a second position, that is, with valve 13 seated on valve seat 14, as shown in phantom outline on the right-hand side of FIG. 2, the communication relation between the inlet ports and the delivery port is in a reverse order to that above described when the valve member is in its said first position.

As above noted, in certain types of previously known double check valve devices, should the valve member corresponding to the valve member 8 stop or "hang-up" in a midway position, as shown in FIG. 1, due to equal pressures acting on the opposite ends thereof, communication between the delivery port and both the inlet ports 2 and 3 would be cut off simultaneously, which, in some uses of the valve device, would be undesirable. According to the present invention, therefore, the valve member 8 is provided with an annular groove 16 peripherally encircling said valve member midway between its two ends to form lands on opposite sides of said annular groove, and a plurality of longitudinally disposed grooves 17 circumferentially spaced about the valve member in one of said lands, each of said longitudinal grooves having one end connected to said annular groove and the other end opening to the same face of said valve member adjacent one of the pressure chambers, as, for example, chamber 11 in this instance with said lands making sealing and sliding contact with the bore 9. O-rings 18 and 19 are disposed in annular V-shaped grooves 20 and 21 formed directly behind each of the valve portions 12 and 13, respectively, of the shuttle valve member 8 to provide sealing contact with the valve seats 14 or 15, respectively, depending upon which of its first or second positions the valve member is occupying.

Of course, under normal operating conditions, as long as a differential in pressure exists between the chambers 10 and 11, the valve member 8 would be operated to either its first or second position, depending upon which of said chambers had the higher pressure, so that delivery port 4 would be in communication with one or the other of the inlet ports 2 and 3, respectively. Should the respective pressures in chambers 10 and 11 become equal, the vave member 8 would assume a midway position, as shown in FIG. 1. However, with annular groove 16 and longitudinal grooves 17 provided on the valve member 8, as above described, communication between the delivery port 4 and at least one of the inlet ports 2 and 3 is insured at all times, notwithstanding that the valve member may stop in a midway or "dead center" position. In this instance, with valve member 8 in its midway position, communication is maintained between delivery port 4 and inlet port 3 and, therefore, to the fluid pressure supply line connected via conduit 6. As a matter of choice, however, the connection of the valve device between conduits 5 and 6 may be reversed, if it is so desired.

Having now described the invention, what I claim as new and desire to secure by Letters Patent, is:

1. A double check valve device comprising a casing having a coaxially disposed bore extending therethrough to provide a fluid pressure inlet at each end thereof and a fluid pressure outlet opening therefrom between said inlets, and a cylindrical shuttle valve member subject at opposite ends thereof to respective opposing fluid pressures prevailing at said inlets and being axially selectively shiftable in said bore to one or the other of two positions responsively to the predominating pressure of the two inlet pressures for alternatively effecting communication between one or the other of said inlets and said outlet, said shuttle valve member being characterized by two lands, an annular groove circumferentially encircling said shuttle valve member between said two lands and at least one longitudinally disposed groove in the peripheral surface of only one of said lands for connecting said annular groove with the corresponding end of said shuttle valve member, said lands having sealing and sliding contact with said bore, said shuttle valve member also being of such length relative to the length of said bore that the other of said lands is positioned in said bore in interposed relation between either of said inlets and the outlet in either of said two positions of the valve member, said longitudinally disposed groove serving to maintain communication between one of said inlets and said outlet in a position of the shuttle valve member intermediate said inlets.

2. A double check valve device comprising:
 (a) a generally cylindrical casing having a coaxial bore extending therethrough with a fluid pressure inlet at each end thereof surrounded by an annular valve seat and a fluid pressure outlet opening from said bore midway between said inlets,
 (b) a cylindrical shuttle valve member having an annular valve portion at each end thereof and being axially selectively operable in said coaxial bore alternatively between a first position, in which one of said valve portions is seated on one valve seat adjacent thereto, and a second position in which the other of said valve portions is seated on the other valve seat, responsively to the predominating pressure of the respective pressures prevailing in said inlets,
 (c) said shuttle member being operative in its said first position to cut off a first communication between the inlet adjacent said one valve seat and said outlet and to establish a second communication between the other inlet and said outlet, and when in its said second position, to cut off said second communication and to establish said first communication,
 (d) said shuttle valve member comprising two lands with an annular groove formed therebetween midway between the ends of the valve member, said lands making sealing and sliding contact with said bore, one of said lands having a plurality of longitudinally disposed grooves circumferentially spaced around the peripheral surface thereof, each of which longitudinally disposed grooves has one end open to said annular groove and the other end open to one end of said shuttle valve member,
 (e) said shuttle valve member also being of such length relative to the length of said bore that the other of said lands is positioned in said bore in interposed relation between either of said inlets and the outlet in either said first position or said second position of said shuttle valve member,
 (f) said longitudinally disposed grooves serving to maintain communication between one of said inlets and said outlet in the event that said shuttle valve member assumes a position midway in said bore due to coincidental occurrence of equal pressures prevailing in both of said inlets.

References Cited
UNITED STATES PATENTS

| 2,354,791 | 8/1944 | Boldt | 137—112 |
| 2,718,233 | 9/1955 | Krummel | 137—119 |
| 3,038,487 | 6/1962 | Gardner | 137—112 |

FOREIGN PATENTS

| 500,651 | 11/1954 | Italy. |
| 580,780 | 9/1946 | Great Britain. |

WILLIAM F. O'DEA, *Primary Examiner.*

HAROLD WEAKLEY, *Examiner.*